(12) United States Patent
Morris (10) Patent No.: US 8,720,723 B2
(45) Date of Patent: May 13, 2014

(54) MODULAR RAINWATER STORAGE TANK SYSTEM

(76) Inventor: Glenn Morris, Burnet, TX (US)

(*) Notice: Subject to any disclaimer, the term of this patent is extended or adjusted under 35 U.S.C. 154(b) by 0 days.

(21) Appl. No.: 13/416,374

(22) Filed: Mar. 9, 2012

(65) Prior Publication Data

US 2013/0233862 A1    Sep. 12, 2013

(51) Int. Cl.
*B65D 90/02*    (2006.01)

(52) U.S. Cl.
USPC .......................................... 220/212; 220/565

(58) Field of Classification Search
CPC ............. E03B 3/02; E03B 3/03; B65D 21/00; B65D 21/02; B65D 21/0204
USPC ............. 220/571, 501, 23.4, 23.83, 608, 565, 220/212; 232/43.1; 141/86, 126
See application file for complete search history.

(56) References Cited

U.S. PATENT DOCUMENTS

| | | | | |
|---|---|---|---|---|
| 3,927,790 A | * | 12/1975 | Chase et al. | 220/601 |
| 4,139,114 A | * | 2/1979 | Long et al. | 220/23.4 |
| 5,101,997 A | * | 4/1992 | Bagwell et al. | 220/23.4 |
| 5,405,044 A | * | 4/1995 | Lee | 220/694 |
| 6,102,086 A | * | 8/2000 | Holtby | 141/86 |
| 7,025,879 B1 | * | 4/2006 | Ticknor | 210/232 |
| 2009/0065504 A1 | * | 3/2009 | Vos et al. | 220/212 |
| 2009/0212051 A1 | | 8/2009 | Liu | |
| 2010/0096390 A1 | * | 4/2010 | Allan | 220/565 |

* cited by examiner

*Primary Examiner* — Steven A. Reynolds
*Assistant Examiner* — King M Chu
(74) *Attorney, Agent, or Firm* — Kelly Kordzik; Matheson Keys & Kordzik PLLC (57) ABSTRACT

A modular rainwater storage tank configured to allow storage capacity in a small area when positioned around the corner of a rectangular house or other structure utilizing run off from a roof top. The storage tank may be designed as a three-dimensional quarter-round such that three units will fit in a tight configuration around a right angle. Each storage tank has opposing overflow channels in a raised rim enclosing a recess in the lid. Downspout water is directed to an opening in the raised rim. When the storage tank is full, excess water in the recess in the lid may be directed to an adjacent storage tank in a cascaded configuration. In this manner, three storage tanks may be positioned and cascaded around a corner.

25 Claims, 13 Drawing Sheets

MODULAR RAINWATER STORAGE TANK SYSTEM

TECHNICAL FIELD

This invention relates in general to a modular storage tank and system for catching and storing rainwater.

BACKGROUND AND SUMMARY

Typical rainwater storage tanks have some method of directing rainwater from the roof of a structure into an opening in the storage tank. Some method is also included that allows stored rainwater to be extracted from the storage tank. Prior art storage tanks are designed to be singular (typically cylindrical) storage tanks with little consideration for geometry or modularity.

A modular rainwater storage tank is designed as a three-dimensional quarter-round shape in embodiments of the present invention. One or more of the modular units may be positioned next to a house or other structure from which rainwater runoff is to be captured. The storage tank is designed with a fill opening and an over flow that allows water from the primary storage tank, connected to a downspout, to be directed to an optional second, third, fourth, etc. storage tank. The quarter-round design allows three storage tanks to be efficiently positioned around a right angled corner while increasing the rigidity of the storage tank system. The quarter-round shape increases the rigidity over a typical square storage tank. While a square storage tank has increased volume, the radius R of the quarter-round storage tank need only be increased to 1.128R to have a volume equal to a square storage tank with side equal to R. The top of the storage tank may have a raised rim wide enough to place a fill hole the size of a downspout. The raised rim has one or more channels configured so adjacent storage tanks may be coupled with a channel piece that aids in directing overflow water between storage tanks. An overflow adapter or a water block may be positioned in an overflow channel depending on whether multiple storage tanks are cascade-connected via a channel piece positioned in adjacent channels. A U-shaped clip may be inserted over the raised rims of adjacent storage tanks to increase the rigidity of a multiple storage tank system. A side wall of a storage tank may have a threaded hole configured to accept a faucet for draining each storage tank.

In alternative embodiments, the top lid of the tank is sloped so that the rainwater flows towards a fill hole.

BRIEF DESCRIPTION OF DRAWINGS

FIGS. 5A-9B illustrate alternative embodiments of the present invention.

DETAILED DESCRIPTION

Figure 1A:
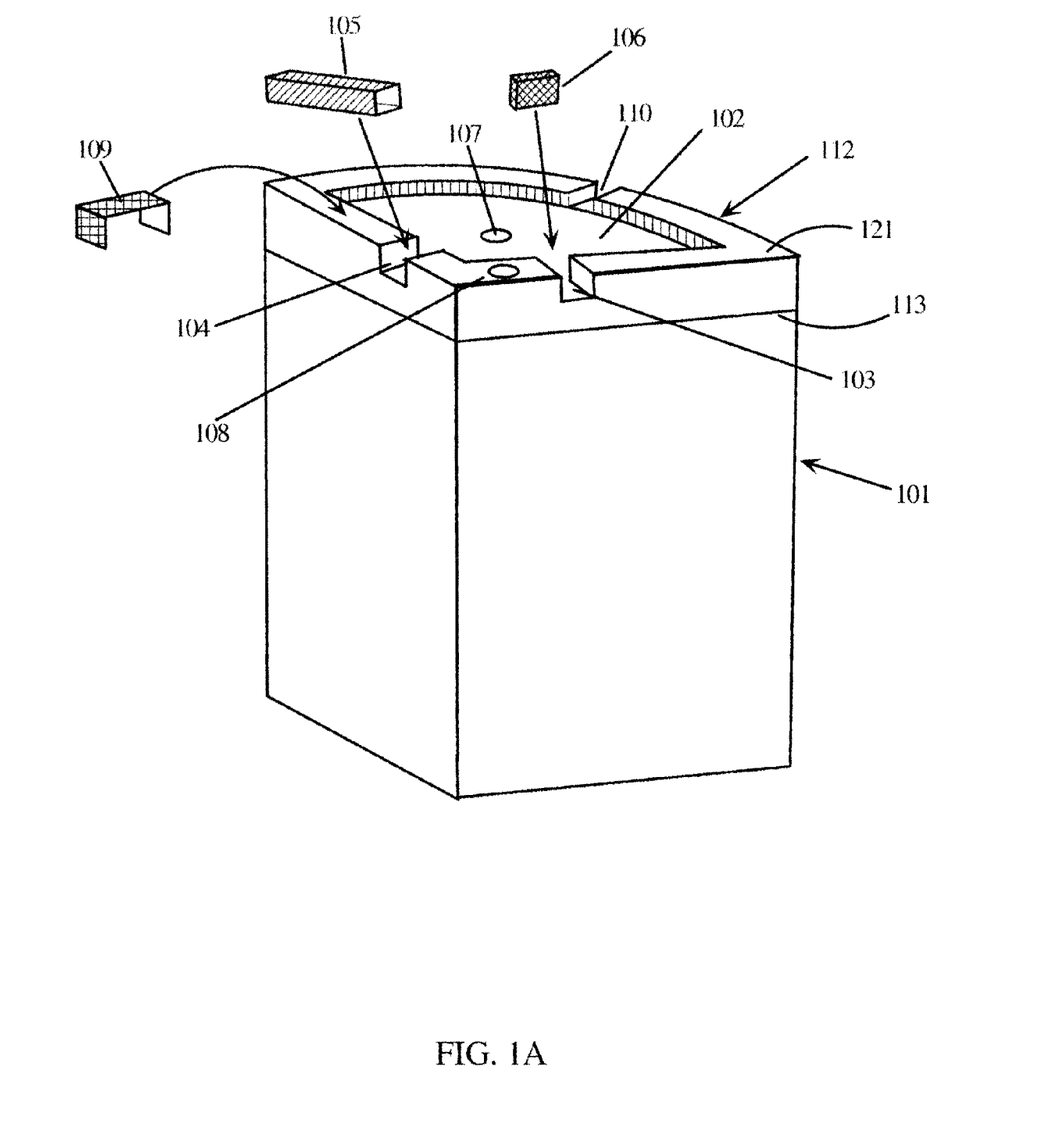
FIG. 1A illustrates an embodiment showing a quarter-round geometry of a storage tank with channel features for cascading water flow from one storage tank to another.

FIG. 1A illustrates a perspective view of a hollow rainwater storage tank 101 according to embodiments herein. A cross-section of the storage tank 101 has a quarter-round shape with a top lid 112 having a raised rim 121 forming a recess 102. Note that the storage tank is not to be limited to a right-angled quarter-round shape, but may be configured to have any cross-section shape. The raised rim 121 has one or more channel features 103, 104, and 110. These channel features are suitably configured to accept an exemplary hollow channel piece 105. The channel piece 105 allows overflow water collected in recess 102 to be channeled to a second storage tank (see FIGS. 3A-3B). Any channel feature 103, 104, 110 not used to transport overflow water may be fitted with a water block 106 to prevent water loss. The channel feature 110 may be formed on the curved side of the rim 121 and may be additionally fitted with a channel piece 105 so that overflow water of a single storage tank may be directed away from any structure positioned next to the storage tank 101. An exemplary clip 109 may be configured to fit over the raised rims 121 on two adjacent units 101 to provide structural support when adjoining two or more storage tanks 101. A clip 109 may have its sides angled towards each other requiring the sides to be sprung outward to insert over the raised rims 121 of adjacent storage tanks 101 thus providing additional holding force.

Figure 2:
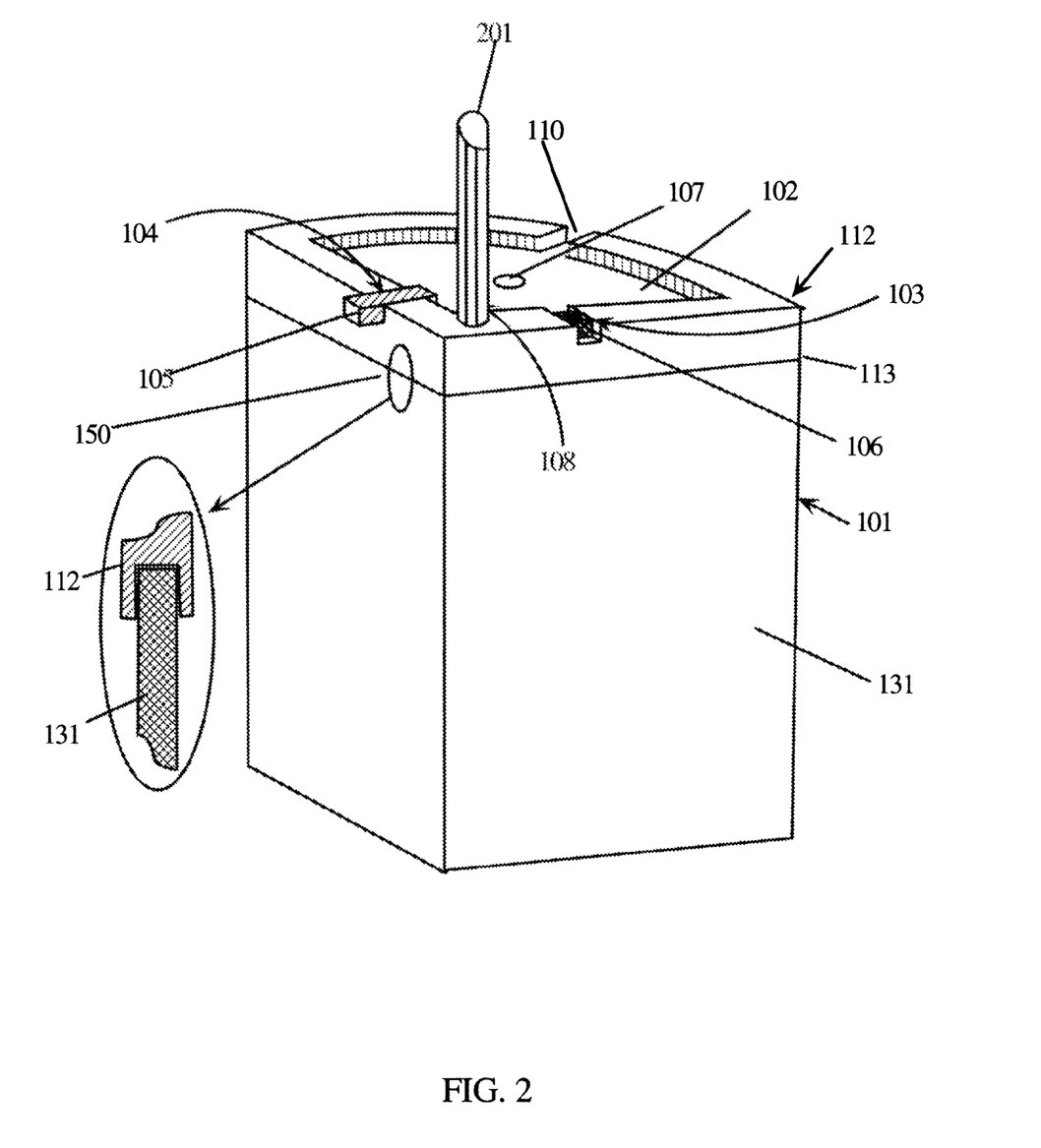
FIG. 2 illustrates the storage tank of FIG. 1 coupled to a downspout pipe with a water block for stopping water flow, a channel piece for conducting water from one storage tank to another, and a clip for securing one storage tank to another in a cascaded configuration.

The storage tank 101 is hollow and receives water (e.g., rainwater) into a fill opening 108 from a structure's rainwater downspout 201 (see FIG. 2). As water completely fills the tank 101, it will overflow into the recess 102 from the overflow opening 107 in the lid 112. The overflow opening 107 is configured to allow overflow water to begin to fill the recess 102. As water fills the recess 102, the water is directed to any channel (e.g., 103, 104, or 110) not blocked by a water block 106. The fill opening 108 is configured to accept a downspout (see FIG. 2) and may be positioned in the rim area 121 so that inlet water can continue to flow into the storage tank 101 while over flow water from the opening 107 flows into the recess 102. The fill opening 108 may be positioned anywhere on the tank 101; the opening 107 may be utilized as a fill opening. While the channels 103, 104, 110 are shown as generally rectangular in shape, it is understood that other geometries may be used for these channels and corresponding fitted elements, the channel piece 105, and the water block 106.

Alternatively, a downspout 201 may be positioned over a lid of the storage tanks described herein so that the rainwater is directed to flow onto the recess 102, 502 (see FIGS. 5A-5B), or 602 (see FIGS. 6A-9B).

The storage tank 101 may be configured as a two-piece unit having a separable lid 112 (e.g., to simplify manufacture). In such an embodiment, the lid 112 would have a parting line 113 when installed and may be configured so that the parting line 113 corresponds substantially to the level of the opening 107. Therefore, water in any storage tank 101 will only rise slightly above the opening 107 before flowing to a next storage tank; thus, little water may leak at the parting line 113 where the lid 112 attaches to the lower body of the storage tank 101.

Figure 1B:
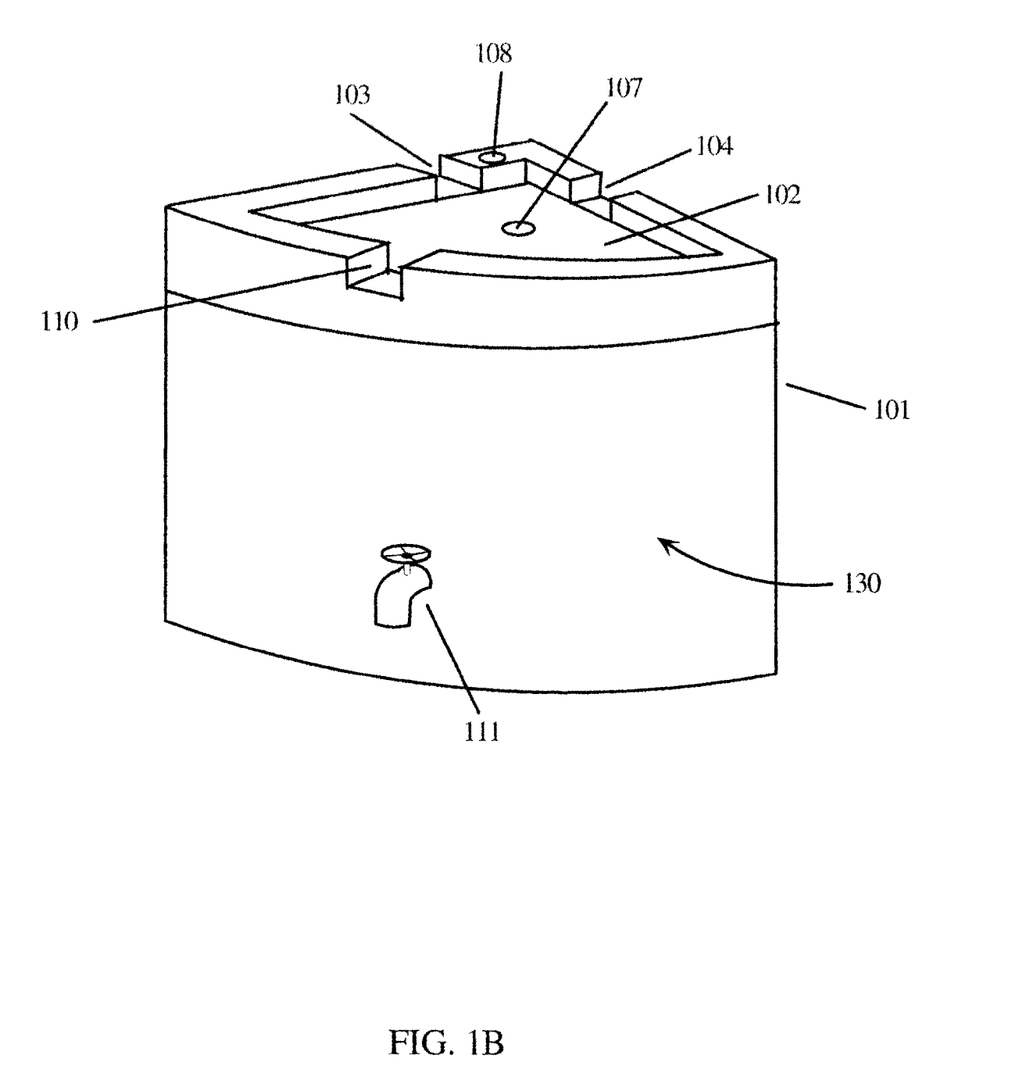
FIG. 1B illustrates a curved side of the storage tank of FIG. 1 including a faucet suitable for extracting stored water.

FIG. 1B is a view of a storage tank 101 showing the curved side 130. The curved side 130 is not limited to the shape shown. Positioned on the curved side 130 may be an exemplary drain faucet 111, which may be attached to a hose (not shown) suitable for extracting water from the storage tank 101. The channels 103, 104, and 110, as well as the fill hole 108, the overflow hole 107, and the recess 102 are shown in this view. A faucet 111 may be positioned sufficiently close to the bottom so that most all of the water in the storage tank 101 may be drained. It is also understood that water may also be extracted from the storage tank 101 by using a siphon or pump (not shown) positioned via an unused fill or overflow hole (e.g., 108 or 107). All of the embodiments described herein may be configured for such ways of extracting the water from the tank(s).

FIG. 2 is a view of a storage tank 101 showing a channel piece 105 inserted in one channel (e.g., 104) and a water block 106 inserted in another channel (e.g., 103); a channel 110 is shown open, though it may be fitted with a water block 106. In this view, the lid 112 has a fill hole 108 in the rim 121 of the storage tank 101 with a section of a downspout 201 inserted. A recess 102 is shown with an overflow hole 107. In an embodiment, the overflow hole 107 is substantially at the same level as a parting line 113 to reduce leakage. In this embodiment, the top 112 may be configured with a U-shaped lip that extends over the top edges of the sides of the body 131 of the storage tank 101. An insert 150 shows a cross-section of the U-shaped lip and the fit between the lid 112 and the body 131 of the storage tank 101 suitable to reduce leakage and improves storage tank rigidity when the lid 112 is in place.

Figure 3A:
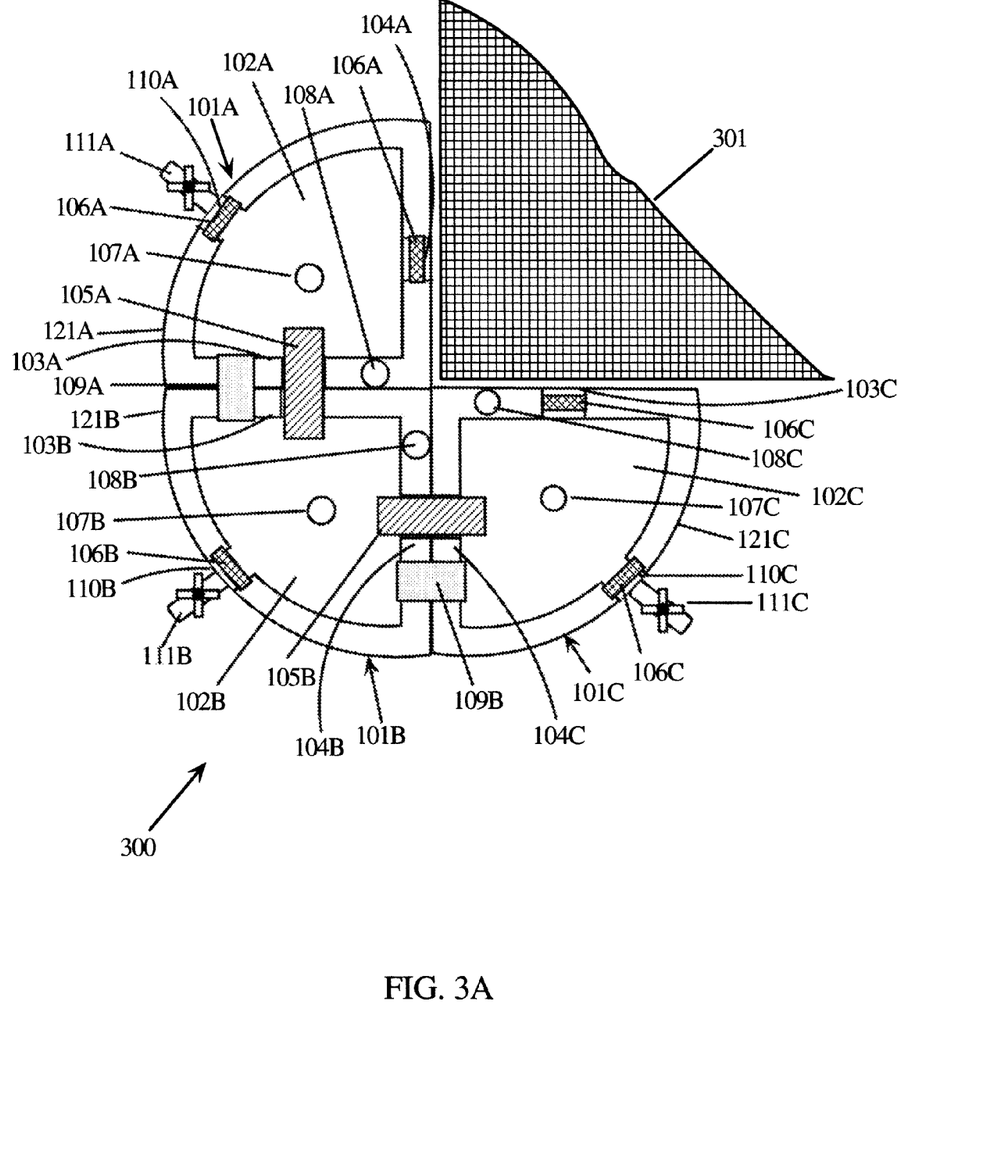
FIG. 3A is a top view of three exemplary storage tanks positioned at the corner of a structure and further illustrating the use of exemplary clips, channel pieces, and water blocks.

FIG. 3A illustrates a top view of three storage tanks 101A, 101B, and 101C (where each of the tanks 101A, 101B, and 101C are substantially configured similar to the tank 101 in FIGS. 1A-2), configured as a storage system 300 so that it can be positioned around a corner of a structure 301 to receive rainwater from the structure via a downspout (see FIG. 2). The three storage tanks, 101A, 101B, 101C, may be held together with clips 109A and 109B fitted over corresponding raised rims 121A, 121B, 121C. The adjacent channels 103A, 103B and 104B, 104C of the storage tanks 101A, 101B and 101B, 101C, respectively, may be each fitted with a channel piece 105A and 105B, respectively. In this manner, only one of the fill holes (108A, 108B, 108C) in the storage tanks 101A, 101B, 101C, respectively, need be coupled to a downspout (e.g., 201 in FIG. 2) supplying rainwater from the structure 301. The other two storage tanks without the downspout are filled by cascaded overflow through the channel pieces 105A, 105B. For example, if a downspout (e.g., 201 in FIG. 2) is coupled to the fill hole 108B, then rainwater will initially fill up the storage take 101B. When such rainwater rises within the storage tank 101B to the opening 107B, it will begin filling the recess 102B and then will flow through one or both of the channels 105A, 105B into the recesses 102A, 102C, respectively, to then begin filling one or both of the storage tanks 101A, 101C through the openings 107A, 107C, respectively.

Water blocks 106A, 106B, 106C may be installed in any unused channels 104A, 110A, 110B, 110C, 103C to prevent leakage through the unused channels. Faucets 111A, 111B, 111C may be used to extract water from the storage tanks 101A, 101B, 101C, respectively. When all three storage tanks are full, water may be extracted via one of the faucets 111A, 111B, 111C, or one of the water blocks 106A, 106B, 106C may be removed to allow overflow water to drain to the ground.

Figure 3B:
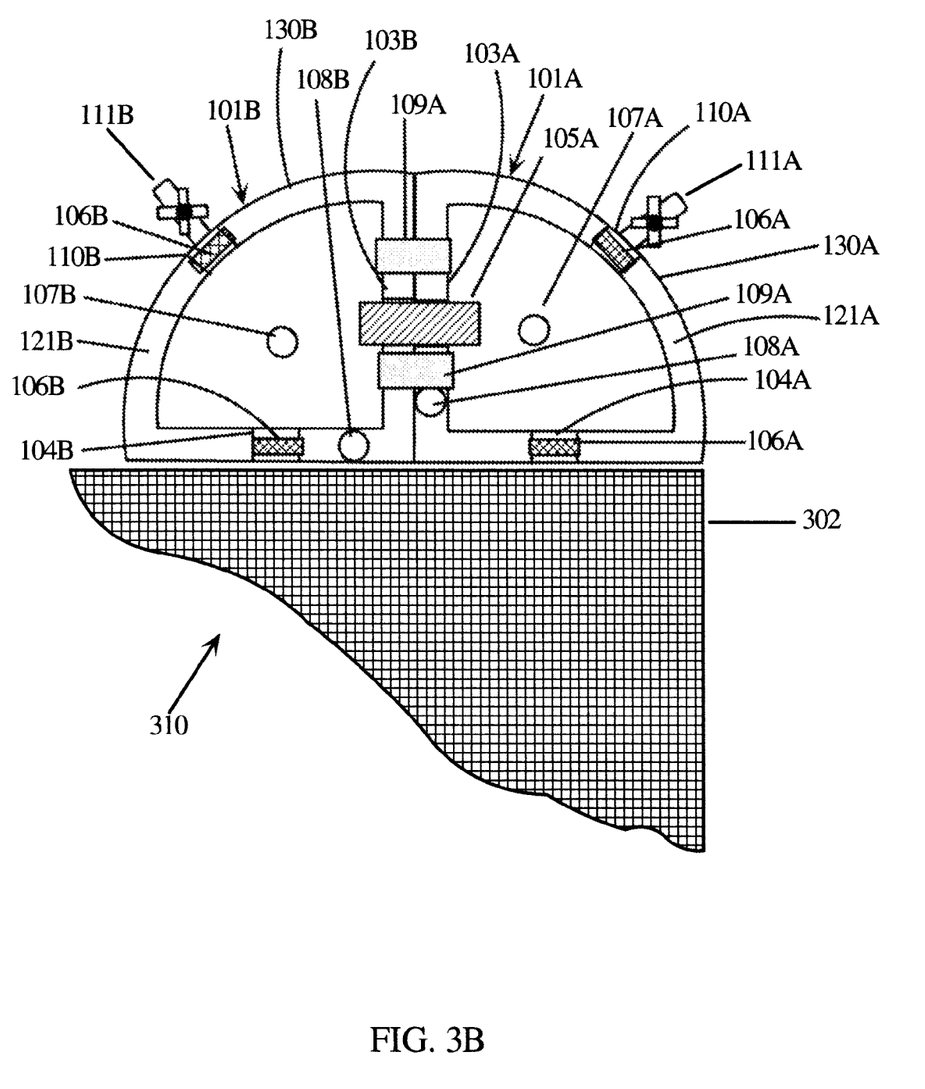
FIG. 3B is a top view of two exemplary storage tanks positioned along the wall of a structure also illustrating the use of a clip, a channel piece, and water blocks.

FIG. 3B illustrates a top view of two storage tanks 101A, 101B (where each of the storage tanks 101A, 101B are substantially configured as the tank 101 in FIGS. 1A-2), configured as a storage system 310 so that it can be positioned along a structure 302. The storage tanks 101A, 101B each have an overflow hole 107A, 107B, respectively. Fill holes 108A, 108B are located in the raised rims 121A, 121B of the storage tank 101A, 101B, respectively. One or more clips 109A may be used to hold the storage tanks 101A, 101B together. Water blocks 106A, 106B may be positioned in any unused channels 104A, 104B. Faucets 111A, 111B may be located in the curved walls 130A, 130B of the storage tanks 101A, 101B, respectively, and may be used to extract water. A channel piece 105A may be positioned in adjoining channels 103A, 103B on, adjacent walls of the storage tanks 101A, 101B. Similarly as with the storage system 300, the storage system 310 may operate to permit the filling of one or both of the tanks 101A, 101B regardless of which tank is coupled to a downspout.

Figure 3C:
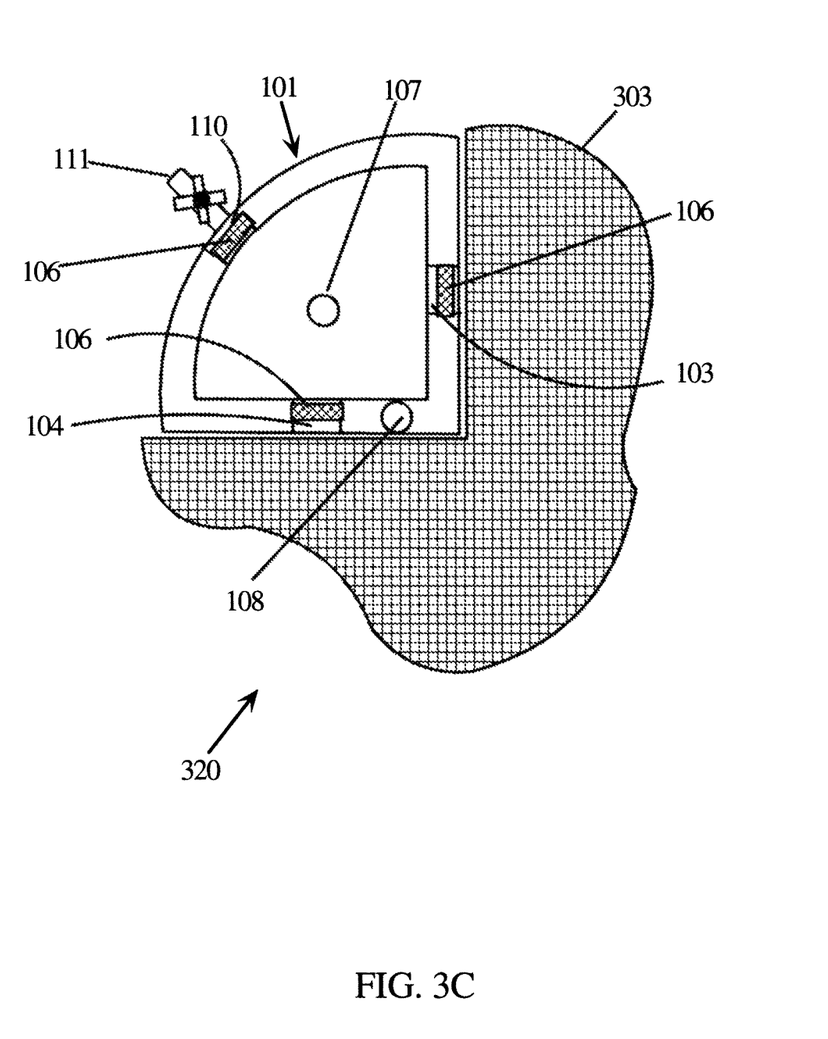
FIG. 3C is a top view of a single exemplary storage tank positioned in an inside corner of a structure.

FIG. 3C illustrates a top view of a water storage system 320 comprising a single storage tank 101 positioned along an inside corner of a structure 303. In this embodiment, the channels 103, 104, 110 have a water block 106 inserted to stop water leakage when the storage tank 101 is full. A downspout (e.g., 201 in FIG. 2) is coupled to the fill hole 108. A faucet 111 may be used to extract stored water.

Figure 4:
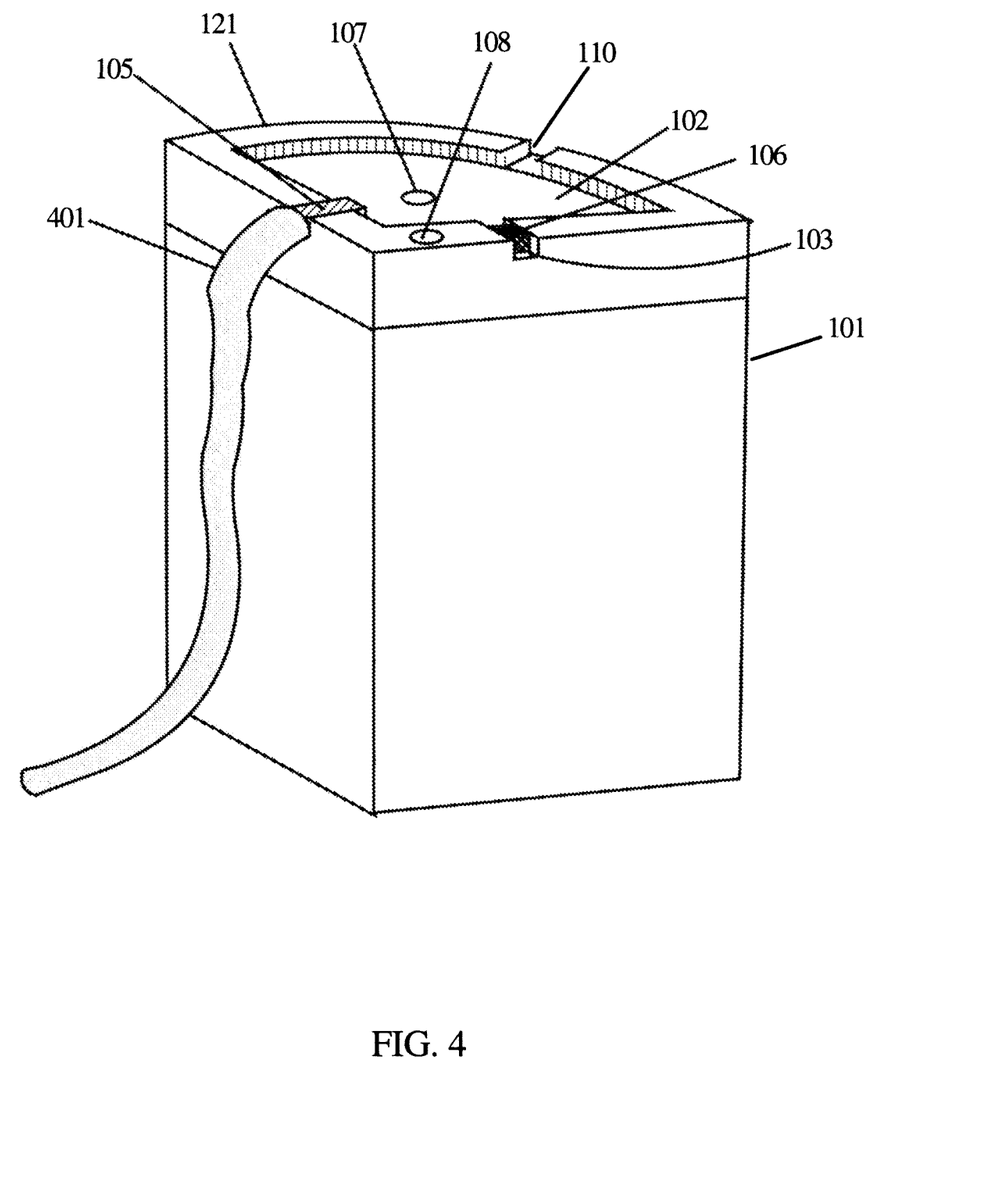
FIG. 4 illustrates a single exemplary storage tank with a water block in one channel and a flexible overflow hose connected to a channel piece in a second channel.

FIG. 4 illustrates a perspective view of an embodiment of a storage tank 101 having a flexible hose 401 coupled to a channel piece 105 used to direct overflow water away from the storage tank 101. All of the embodiments described herein may be configured with a similar configuration. A channel 110 is shown open, and the other channel, has a water block 106 inserted. An overflow hole 107 is positioned in the recess 102. Alternative embodiments to the foregoing may be configured so that water is merely directed into one or more of the recesses 102 instead of via one or more fill holes 108. In this manner, the water will drain from the one or more recesses 102 into the tank body via an overflow hole 107. All of the embodiments described herein may be configured with a similar configuration.

Figure 5A:
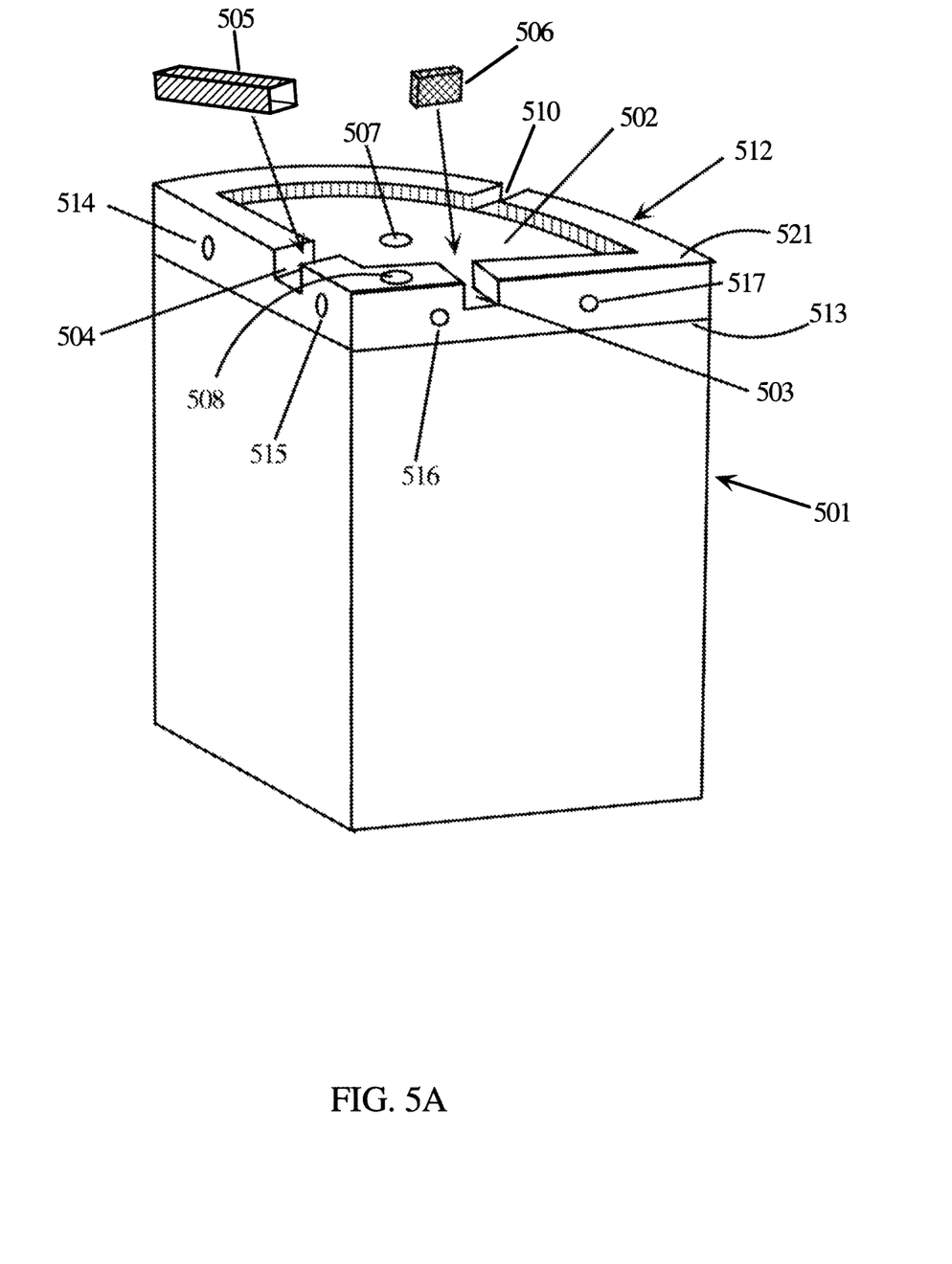
Figure 5B:
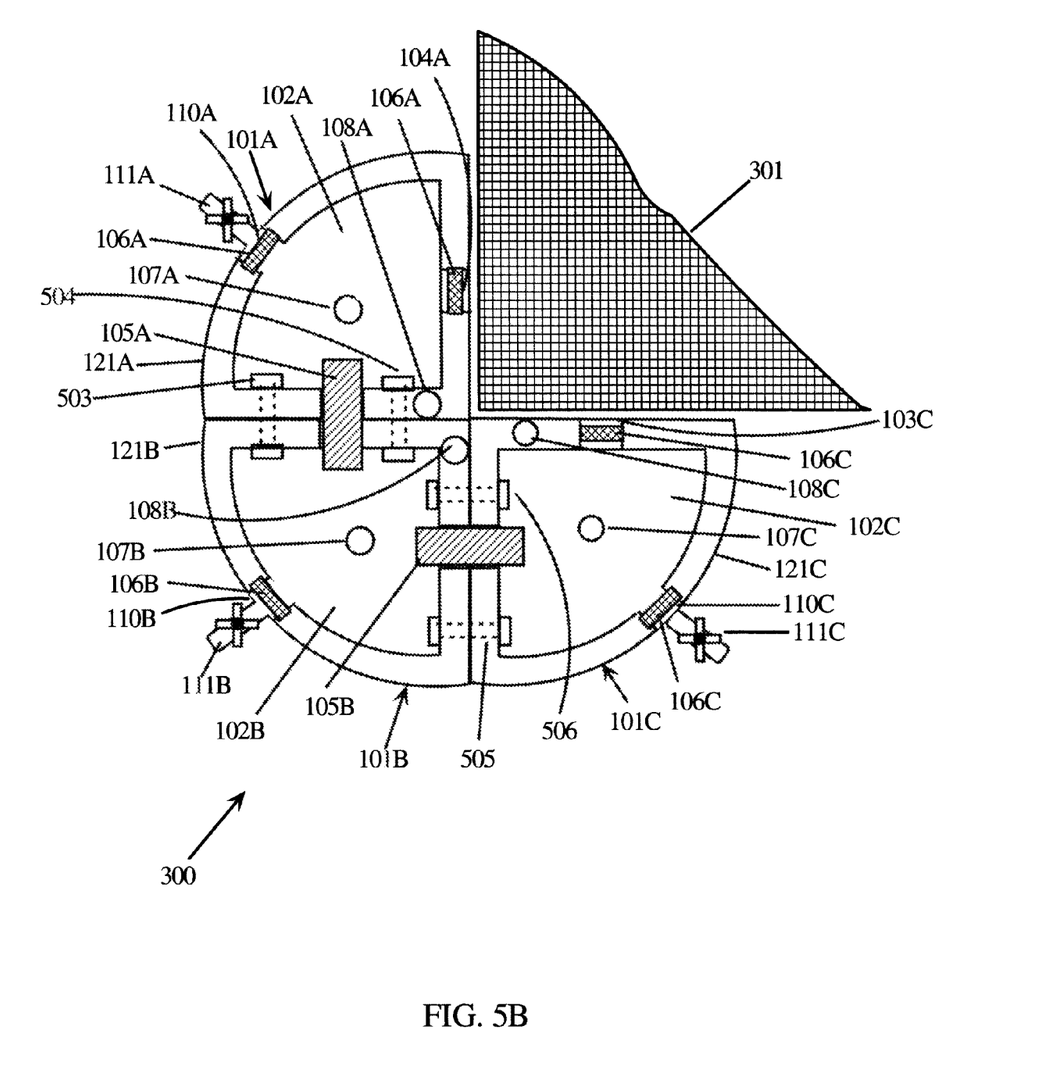

FIGS. 5A-5B illustrate embodiments whereby any number of adjacent storage tanks are bolted together in place of the use of the clips 109 shown in FIGS. 3A-3B. The storage tank 501 illustrated in FIG. 5A is similar to the storage tank 101 illustrated in FIG. 1A. However, a lid 512 is configured with one or more holes 514-517 therethrough for receiving bolts 503-506 (or any equivalent fastening means) as shown in FIG. 5B for fastening together two or more storage units 101.

Figure 6A:
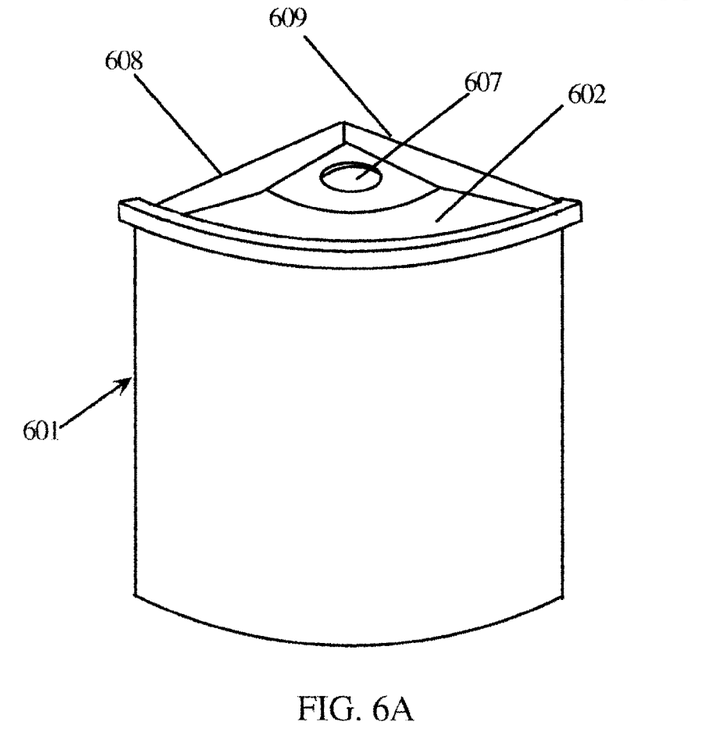
Figure 6B:
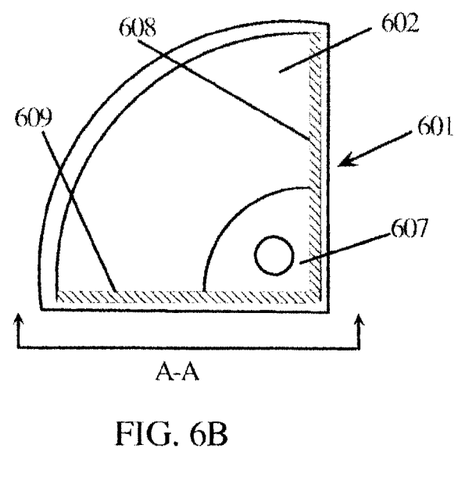
Figure 6C:
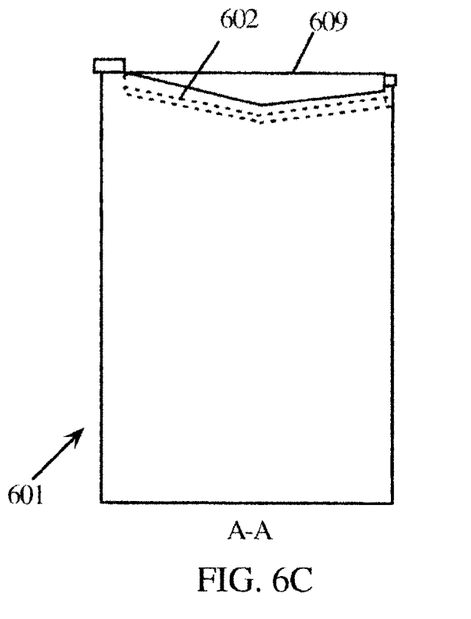

FIGS. 6A-9B illustrate embodiments where instead of channeling water between units through channels 105, the tops of the units are sloped. FIGS. 6A-6C illustrate such a single storage container 601, which is similar to the storage container 101 (not all features are repeated in FIGS. 6A-7B for the sake of simplicity). A downspout (not shown) may drain water into the storage container 601 through a hole (e.g., hole 607) or on its top 602 where it flows into the hole 607. Two tanks 601 are combined in FIGS. 7A-7B where water can overflow from the top of one tank 601 to the other(s) over the depression 702 in the respective lids of the tanks.

Figure 7A:
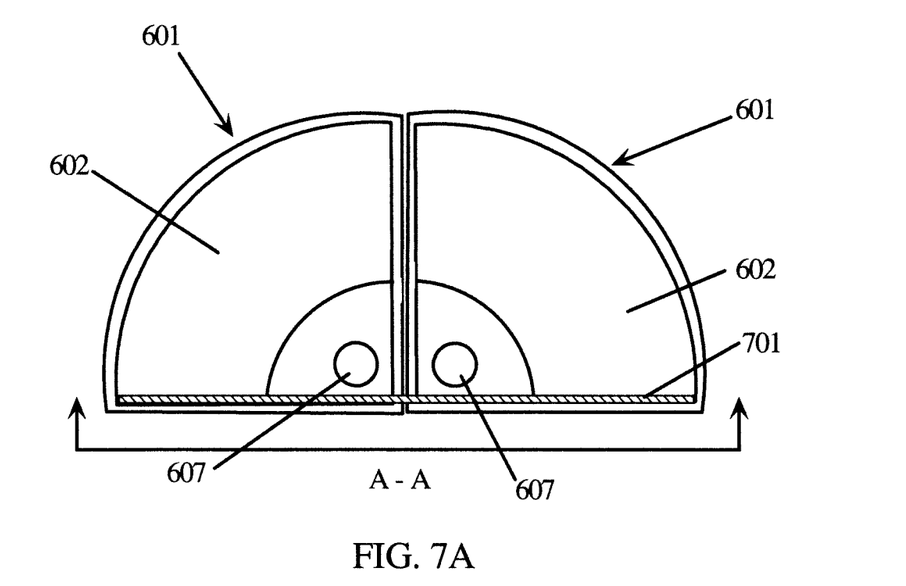
Figure 7B:
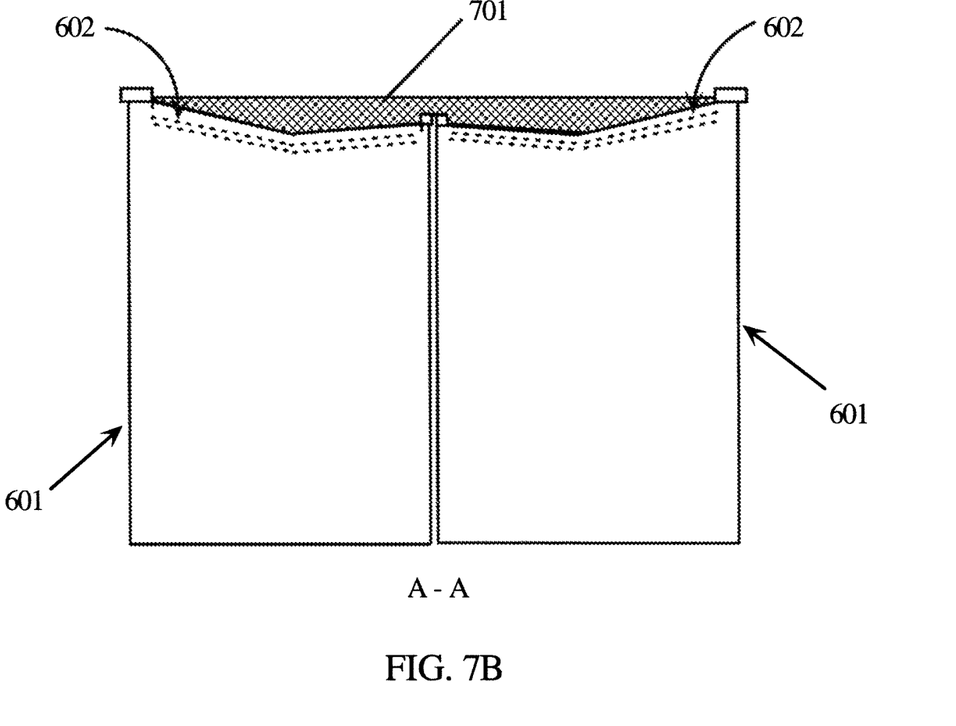

One or more splashguards 608, 609 may be installed (e.g., via some suitable fastening means, such as screws or bolts) along the sloping edges of the top 602 of the tank 601 to channel the water flowing on the top 602 towards the hole 607, so that such water does not flow over the edges of the top 602. FIGS. 7A-7B show a similar splashguard 701 (or multiple splashguards in a suitable combination) installed along edges of the tops 602 of the tanks 601 to channel water from both of the tops 602 towards the holes 607, including overflow from one of the tanks 601 to the other, without allowing water to escape over the edges of the tops 602 outside of the tanks 601. Though not illustrated, a similar system of splashguard(s) may be installed on a three-tank configuration (see FIG. 3A).

Figure 8A:
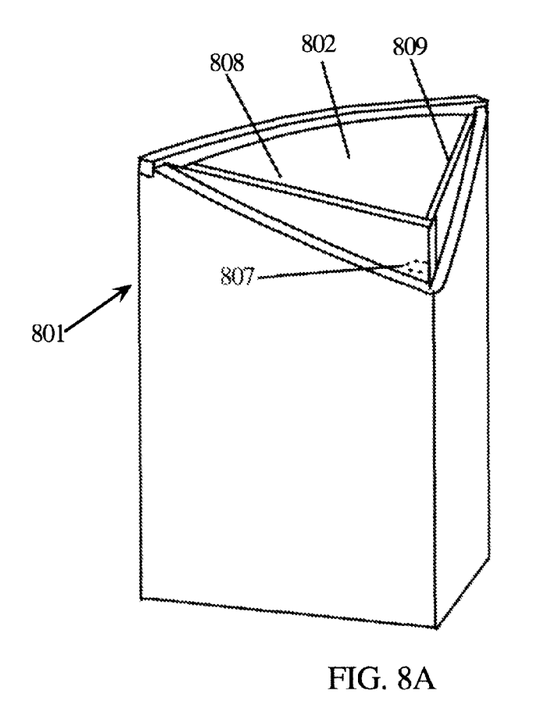
Figure 8B:
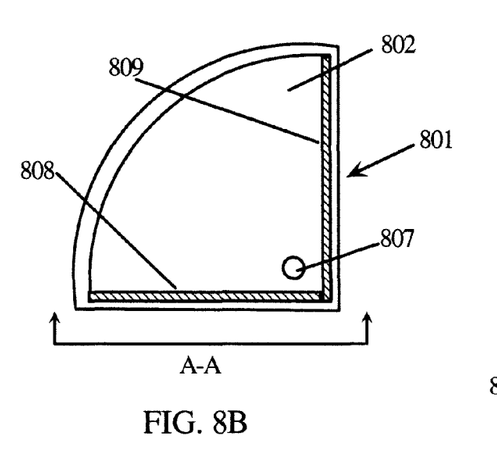
Figure 8C:
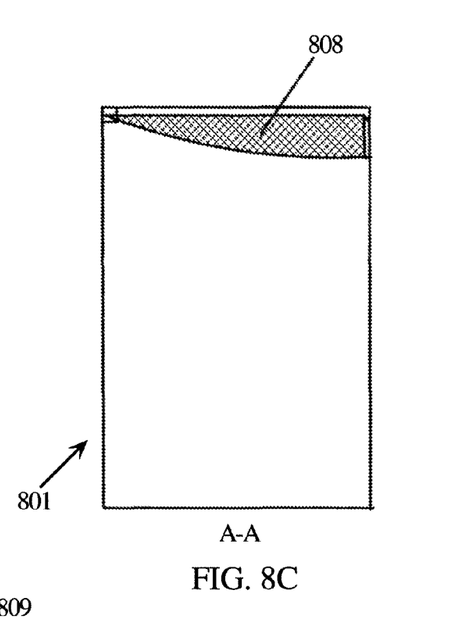

FIGS. 8A-8C and 9A-9B illustrate similar configurations of tanks as shown in FIGS. 6A-6C and 7A-7B, respectively, with a variation in the slopes of the tops 802. FIGS. 8A-8C illustrate such a single storage container 801, which is similar to the storage container 101 (not all features are repeated in FIGS. 8A-9B for the sake of simplicity). A downspout (not shown) may drain water into the storage container 801 through a hole (e.g., hole 807) or on its top 802 where it flows into the hole 807. Two tanks 801 are combined in FIGS. 9A-9B where water can overflow from the top of one tank 801 to the other.

Figure 9A:
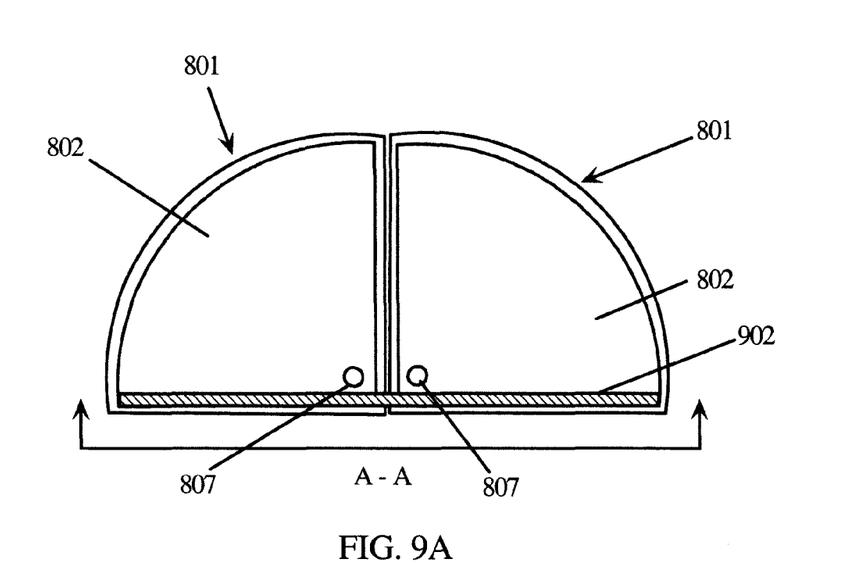
Figure 9B:
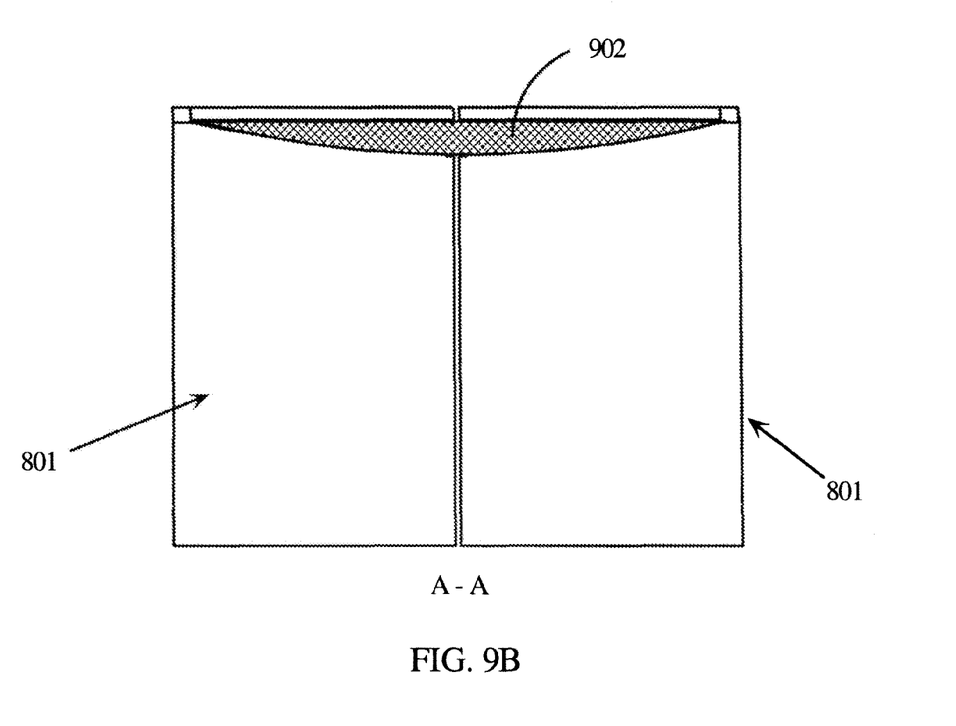

One or more splashguards 808, 809 may be installed (e.g., via some suitable fastening means, such as screws or bolts) along the sloping edges of the top 802 of the tank 801 to channel the water flowing on the top 802 towards the hole 807, so that such water does not flow over the edges of the top 802. FIGS. 9A-9B show a similar splashguard 902 (or multiple splashguards in a suitable combination) installed along edges of the tops 802 of the tanks 801 to channel water from both of the tops 802 towards the holes 807, including overflow from one of the tanks 801 to the other, without allowing water to escape over the edges of the tops 802 outside of the tanks 801. Though not illustrated, a similar system of splashguard(s) may be installed on a three-tank configuration (see FIG. 3A).

Alternative embodiments may have shapes other than the quarter-round shapes. The number of channels in a rim may be one or greater. Other means for extracting the water from a tank may be utilized other than a faucet.

What is claimed is:

1. A water storage tank system comprising one or more storage tanks each having a top section and a hollow tank body configured to collect and hold water, the hollow tank body having first and second flat vertical sides and a curved vertical side forming a three-dimensional quarter-round shaped configuration, wherein the top section has a raised rim having a rim width and extending around a perimeter of the top section thus forming a recess within the top section, wherein the top section forms a fill hole configured for receiving the water from a downspout, wherein the first and second flat vertical sides each have a top edge coupled to the top section and a bottom edge joined to a bottom and first and second side edges, the first side edges of the first and second flat vertical sides are joined at essentially a right angle and the second side edges of the first and second vertical sides are joined to edges of the curved vertical side, wherein the recess has an overflow hole configured for allowing water into the recess when water rises into the raised rim.

2. The system of claim 1, further comprising a splashguard along one or more sides of the raised rim for channeling the water along the top section towards the fill hole and configured for inhibiting the water from flowing over the raised rim.

3. The system of claim 1, wherein the top section is a separate element fitted into a cavity formed by the first and second vertical sides, the curved side, and the hollow tank body.

4. The system of claim 1, wherein the raised rim has one or more channels formed therein extending the rim width.

5. The system of claim 1, wherein the curved vertical side has a faucet extending into a volume of the hollow tank body, the faucet configured for draining water from the hollow storage tank body.

6. A water storage tank system comprising:
one or more storage tanks each having a top section and a hollow tank body configured to collect and hold water, the hollow tank body having first and second flat vertical sides and a curved vertical side forming a three-dimensional quarter-round shaped configuration, wherein the top section has a raised rim having a rim width and extending around a perimeter of the top section thus forming a recess within the top section, wherein the top section forms a fill hole configured for receiving the water from a downspout;
three of the storage tanks positioned relative to each other to form three quarters of a curve; and
a channel piece inserted into channels of each of two adjacent ones of the storage tanks, the channel pieces configured for conducting overflow water between the three storage tanks.

7. The system of claim 6, further comprising water blocks inserted in each of the channels in the three storage tanks not having a channel piece inserted.

8. A water storage tank system comprising:
one or more storage tanks each having a top section and a hollow tank body configured to collect and hold water, the hollow tank body having first and second flat vertical sides and a curved vertical side forming a three-dimensional quarter-round shaped configuration, wherein the top section has a raised rim having a rim width and extending around a perimeter of the top section thus forming a recess within the top section, wherein the top section forms a fill hole configured for receiving the water from a downspout;
two of the storage tanks positioned with their first vertical sides adjacent and parallel to each other; and
a channel piece inserted into the channels of the two adjacent storage tanks, the channel pieces conducting overflow water between the two storage tanks.

9. The system of claim 8, further comprising water blocks inserted in each of the channels in the two storage tanks not having a channel piece inserted.

10. The system of claim 9, further comprising a means for fastening together adjacent storage tanks to provide structural support.

11. A water storage tank system comprising one or more storage tanks each having a top section and a hollow tank body configured to collect and hold water, the hollow tank body having first and second flat vertical sides and a curved vertical side forming a three-dimensional quarter-round shaped configuration, wherein the top section has a raised rim having a rim width and extending around a perimeter of the top section thus forming a recess within the top section, wherein the top section forms a fill hole configured for receiving the water from a downspout, wherein four of the storage tanks are arranged in a cylindrical shape with channel pieces interconnecting the four storage tanks making a capacity of one large tank.

12. The system of claim 1, wherein the raised rim is configured to allow water to pass over a portion of the raised rim from a first one of the storage tanks to a second one of the storage tanks so that water that has filled the first one of the storage tanks can flow to and begin to fill into the second one of the storage tanks.

13. A water storage tank system comprising two or more storage tanks each having a top section and a hollow tank body configured to collect and hold water, wherein the top section forms a fill hole configured for receiving the water from a downspout, the top section configured for conducting overflow water between the storage tanks, wherein two adjacent ones of the storage tanks are positioned with their respective vertical sides adjacent and parallel to each other, wherein a channel piece is inserted into the channels of each of the two adjacent ones of the storage tanks.

14. A water storage tank system comprising:
two or more storage tanks each having a top section and a hollow tank body configured to collect and hold water, wherein the top section forms a fill hole configured for receiving the water from a downspout, the top section configured for conducting overflow water between the storage tanks, wherein the top section is configured with one or more channels for conducting the overflow water between the storage tanks; and
one or more water blocks inserted in each of the channels in the storage tanks where the overflow water is not to be conducted.

15. A water storage tank system comprising two or more storage tanks each having a top section and a hollow tank body configured to collect and hold water, wherein the top section forms a fill hole configured for receiving the water from a downspout, the top section configured for conducting overflow water between the storage tanks, wherein each of the top sections has a raised rim having a rim width and extending around a perimeter of the top section thus forming a recess within the top section, wherein the recess has an overflow hole configured for allowing water into the recess when water rises into the raised rim.

16. The system of claim 15, wherein the raised rim has one or more channels formed therein extending the rim width.

17. The system of claim 13, wherein each of the storage tanks comprises a faucet extending into a volume of the hollow tank body, each faucet configured for draining water from its respective hollow tank body.

18. The system of claim 15, wherein the raised rim forms the fill hole configured for receiving the water from the downspout.

19. The system of claim 15, wherein the overflow hole is the fill hole.

20. The system of claim 15, wherein the raised rim is configured to allow water to pass over a portion of the raised rim from a first one of the storage tanks to a second one of the storage tanks so that water that has filled the first one of the storage tanks can flow to and begin to fill into the second one of the storage tanks.

21. The system of claim 1, wherein adjacent ones of the storage tanks are configured for permitting an overflow of the water between storage tanks adjacently positioned to each other.

22. The system of claim 6, wherein the three storage tanks are configured for permitting an overflow of the water between storage tanks adjacently positioned to each other.

23. The system of claim 8, wherein the two storage tanks are configured for permitting an overflow of the water between the storage tanks.

24. The system of claim 13, wherein two adjacent ones of the storage tanks are positioned with their respective vertical sides adjacent and parallel to each other, wherein the two adjacent ones of the storage tanks are configured to conduct overflow water between the two adjacent ones of the storage tanks.

25. The system of claim 13, wherein the top sections of two adjacent ones of the storage tanks are configured to conduct overflow water between the two adjacent ones of the storage tanks.

* * * * *